(12) United States Patent
Sunahara

(10) Patent No.: US 6,210,805 B1
(45) Date of Patent: Apr. 3, 2001

(54) GLASS PLATE PROVIDED WITH A CONDUCTIVE LAYER, METHOD FOR ITS PRODUCTION, CONDUCTIVE PASTE AND WINDOW FOR AN AUTOMOBILE

(75) Inventor: Kazuo Sunahara, Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/236,573

(22) Filed: Jan. 26, 1999

(30) Foreign Application Priority Data

Jan. 29, 1998 (JP) .................................................. 10-017418

(51) Int. Cl.$^7$ ..................................................... B32B 15/00
(52) U.S. Cl. ...................... 428/434; 428/425.6; 428/426; 428/427; 428/428
(58) Field of Search .................................... 428/434, 427, 428/428, 425.6, 426

(56) References Cited

U.S. PATENT DOCUMENTS

| 4,057,671 | * | 11/1977 | Shoop | 428/208 |
| 4,098,949 | * | 7/1978 | Kosiorek | 428/434 |
| 4,446,059 | * | 5/1984 | Eustice | 106/1.14 |
| 4,728,781 | * | 3/1988 | Donley et al. | 428/210 |
| 4,975,301 | * | 12/1990 | Andrews et al. | 427/123 |
| 5,417,745 | * | 5/1995 | Oprosky et al. | 106/1.14 |

FOREIGN PATENT DOCUMENTS

| 50-155514 | 12/1975 | (JP) . |
| 5-38405 | 6/1993 | (JP) . |

* cited by examiner

*Primary Examiner*—Cathy Lam
(74) *Attorney, Agent, or Firm*—Oblon, Spivak, McClelland, Maier & Neustadt, P.C.

(57) ABSTRACT

A glass plate provided with a conductive layer, which comprises a glass plate, a conductive layer baked to the glass plate and containing a conductive material as the main component, and a glass exudate coating layer formed to substantially cover the conductive layer and containing low melting point glass as the main component.

4 Claims, No Drawings

GLASS PLATE PROVIDED WITH A CONDUCTIVE LAYER, METHOD FOR ITS PRODUCTION, CONDUCTIVE PASTE AND WINDOW FOR AN AUTOMOBILE

BACKGROUND OF THE INVENTION

1. Field of the Invention

The present invention relates to a glass plate provided with a conductive layer, which has a conductive layer formed on a glass plate of e.g. a rear window of an automobile to prevent fogging of such a rear window, a method for its production, a conductive paste which forms a glass exudate coating layer by firing, and a window for an automobile wherein the glass plate provided with a conductive layer is used.

2. Discussion of Background

To prevent fogging of a glass plate used for a rear window of an automobile, a plurality of conductive strips for heating and common power source lines (bus bars) connected to both ends of the conductive strips, are printed and fired on the glass plate. Metallic terminals for lead wires are attached to the bus bars by soldering. A voltage is applied across the metallic terminals to let the conductive strips generate heat so that the surface temperature of the glass plate is maintained at a level higher than the dew point, whereby fogging of the glass plate can be prevented.

The conductive strips are formed on the glass plate by printing a conductive paste on the glass plate and then firing it. In the case of a glass plate for an automobile, the width of such conductive strips is usually at most 1 mm and about 0.4 mm at the center portion of the glass plate, in order to secure the visibility.

Such a conductive paste is prepared usually by mixing a conductive material powder such as a silver powder, a low melting point glass powder, an organic varnish and in some cases, an inorganic refractory filler powder. When the printed conductive paste is fired, the conductive material powder such as a silver powder will be sintered to form a conductive layer. The surface of the conductive layer facing the substrate, is baked to the substrate by low melting point glass formed by melting of the low melting point glass powder. Here, the substrate means the glass plate or a ceramic color layer formed on the glass plate surface.

In recent years, along with the diversification of automobile designs, it is desired to make the rear window or the like provided with conductive strips slidable. If such a rear window or the like provided with conductive strips is made slidable, the conductive layer of the conductive strips is likely to be abraded due to friction between the rear window and the rubber packing, which takes place during the sliding operation. This is likely since the hardness of the conductive layer exposed on the surface of the conductive strips is small.

As a method for preventing such abrasion of the conductive layer, there has been known (1) a method wherein a dense and highly hard copper-nickel layer is formed by electroplating treatment on the surface of the conductive strips printed and fired on the glass plate, or (2) a method wherein a conductive paste to form conductive strips is coated with a predetermined width, then a glass paste is coated with a width wider than the above width, followed by heating for baking to form a glass layer on the surface of the conductive strips (JP-A-50-15514).

These conventional methods involve many process steps and accordingly have had problems such that the operation efficiency tends to be poor, and the cost tends to be high. Further, in the method (2), overflow of the glass layer beyond the conductive strips tends to be substantial, whereby a see-through image is likely to be deformed.

SUMMARY OF THE INVENTION

It is an object of the present invention to provide a glass plate provided with a conductive layer, a method for its production, a conductive paste for forming a glass exudate coating layer by firing and a window for an automobile wherein the glass plate provided with a conductive layer is used, which overcome the above problems.

The present invention provides a glass plate provided with a conductive layer, which comprises a glass plate, a conductive layer baked to the glass plate and containing a conductive material as the main component, and a glass exudate coating layer formed to substantially cover the conductive layer and containing low melting point glass as the main component.

Further, the present invention provides a method for producing a glass plate provided with a conductive layer, which comprises printing on a glass plate a conductive paste comprising at least from 50 to 90 wt % of a conductive material powder and from 10 to 50 wt % of a low melting point glass powder, as inorganic components, followed by firing.

The present also provides a conductive paste to be printed on a glass plate and fired to produce a glass plate provided with a conductive layer, whereby a glass exudate coating layer is formed by exudation to the conductive layer surface of low melting point glass formed by melting of a low melting point glass powder contained in the conductive paste at the time of the firing.

Still further, the present invention provides a window for an automobile, wherein the above glass plate provided with a conductive layer is used as a sliding window glass plate for the automobile.

DETAILED DESCRIPTION OF THE PREFERRED EMBODIMENTS

In the present invention, the conductive material is one which imparts a desired electrical conductivity to the conductive layer. As the conductive material, silver, gold, platinum, a silver-platinum alloy, a silver-palladium alloy, a silver-rhodium alloy or rhodium oxide may, for example, be used. It is preferred to use silver for such reasons that the electroconductivity is high, it is readily available, and the price is low.

In the present invention, the conductive layer contains a conductive material as the main component, and its content is usually at least 50 wt %.

In the present invention, the conductive layer surface means the surface on the side not baked to the substrate (the glass plate or a ceramic color layer formed on the glass plate surface).

In the present invention, the conductive layer is one baked to the glass plate, or to the ceramic color layer formed on the glass plate surface. In the following description, reference is made to a case where the conductive layer is baked to a glass plate.

In the present invention, the low melting point glass is glass which starts to be softened and flow at a temperature lower than the softening point (about 730° C.) of soda lime glass which is commonly used as a glass plate.

In the present invention, the glass exudate coating layer is one formed by exudation to the conductive layer surface of low melting point glass formed by melting of a low melting point glass powder contained in the conductive paste, at the time of firing, and it contains a low melting point glass as the main component. The content is usually at least 50 wt %. The glass exudate coating layer may contain an inorganic refractory filler in addition to the low melting point glass. In such a case, the glass exudate coating layer is a layer wherein the total amount of the low melting point glass and the inorganic refractory filler is at least 50 wt %.

The detailed mechanism of exudation of the low melting point glass to the conductive layer surface is not clearly understood. However, it is considered that at the time of the firing, the conductive material powder contained in the conductive paste is densified, whereby the low melting point glass is extruded or squeezed out to the conductive layer surface.

In the present invention, each of the low melting point glass and the inorganic refractory filler has a hardness higher than the conductive layer. Accordingly, the abrasion resistance of the conductive layer can be improved by covering the conductive layer with the glass exudate coating layer containing the low melting point glass, or the low melting point glass and the inorganic refractory filler.

When a metallic power supply terminal for a lead wire is to be electrically connected to the conductive layer by soldering or the like, the conductive layer will be provided with a portion to be connected with such a power supply terminal. Such a portion may be formed, for example, by 1) removing the glass exudate coating layer, or 2) printing a conventional conductive paste over the conductive paste of the present invention, followed by firing. By the method 1) or 2), this portion will not substantially be covered with the glass exudate coating layer. Namely, the conductive layer surface of this portion will be electrically connected with the interior of the conductive layer. Here, the conventional conductive paste is one whereby a glass exudate coating layer will not be formed at the time of the firing.

The glass plate provided with a conductive layer of the present invention can be produced by printing a conductive paste on a glass plate, followed by firing. During the firing, the conductive material powder will be sintered to form a conductive layer. The side of the conductive layer which is adjacent to the glass plate, will be baked to the glass plate by low melting point glass formed by melting of the low melting point glass powder. On the other hand, the majority of the rest of low melting point glass which does not contribute to bonding to the glass plate, will exude to the surface of the conductive layer when the conductive material powder is sintered. Consequently, the conductive layer surface will be covered by the low melting point glass having a hardness higher than the conductive layer, whereby the abrasion resistance of the conductive layer will be improved.

The conductive paste usually contains an organic varnish to impart printability to the conductive paste, in addition to the conductive material powder and the low melting point glass powder.

The organic varnish is not particularly limited so long as it is one having an organic resin having a binder function dissolved in a solvent and being capable of imparting printability to the conductive paste. As the organic varnish, it is preferred to use one having at least one organic resin selected from the group consisting of an ethyl cellulose resin, an acrylic resin, a styrene resin and a phenol resin dissolved in at least one solvent selected from the group consisting of α-terpineol, butylcarbitol acetate and a phthalic acid ester, since such materials are readily commercially available.

Now, the conductive paste of the present invention will be described.

As the conductive material powder, it is preferred to employ a silver powder in view of merits such that the electrical conductivity is high, it is readily available and the price is low. The average particle size of the silver powder is preferably at most 20 $\mu$m, more preferably from 0.1 to 10 $\mu$m, most preferably from 0.1 to 6 $\mu$m, in view of the printability of the conductive paste. As the silver powder, a mixture of at least two types of foil-shaped silver powders or silver powders having different average particle sizes, may be employed so that the printability or the sinterability can better be controlled. Further, other conductive materials such as gold, platinum, a silver-platinum alloy, a silver-palladium alloy, a silver-rhodium alloy and rhodium oxide may be incorporated to control the electrical resistance of the conductive layer or to prevent solder deterioration (a phenomenon in which silver dissolves in the solder to deteriorate the bonding strength and, in an extreme case, the conductive layer falls off, whereby soldering will be impossible).

The content of the conductive material powder in the conductive paste is preferably from 50 to 90 wt %, based on the entire inorganic substances in the conductive paste. If the content is less than 50 wt %, the electrical resistance of the conductive layer tends to be too high, and the conductive layer tends to hardly perform the function as a heating strip. The content is preferably at least 60 wt %. If it exceeds 90 wt %, the content of the low melting point glass powder in the conductive paste tends to be too low, and the amount of the low melting glass exuding to the conductive layer surface tends to be small, whereby covering of the conductive layer surface with the low melting point glass tends to be incomplete, and the abrasion resistance of the conductive layer tends to be poor. Here, the entire inorganic substances mean all conductive paste materials except for organic materials such as the organic varnish.

The content of the low melting point glass powder in the conductive paste is preferably from 10 to 50 wt %, based on the entire inorganic substances in the conductive paste. If the content is less than 10 wt %, the amount of the low melting point glass exuding to the conductive layer surface tends to be small, whereby covering of the conductive layer surface with the low melting point glass tends to be incomplete, and the abrasion resistance of the conductive layer tends to be poor. If it exceeds 50 wt %, the proportion of the low melting point glass in the conductive layer increases, whereby the electrical resistance of the conductive layer tends to be too high, and the conductive layer tends to hardly perform the function as a heating strip. The content is preferably at least 40 wt %.

Further, an inorganic refractory filler powder may optionally be incorporated to the conductive paste of the present invention. By incorporating an inorganic refractory filler having a hardness higher than the low melting point glass, the glass exudate coating layer of the conductive layer will contain the inorganic refractory filler in addition to the low melting point glass, whereby the abrasion resistance of the conductive layer can be improved. Further, the inorganic refractory filler may be employed for the purpose of controlling the thermal expansion coefficient as a conductive strip.

As such an inorganic refractory filler, α-alumina, quartz, Zircon, cordierite or forsterite may, for example, be used.

The content of the inorganic refractory filler powder in the conductive paste is preferably at most 30 wt % based on the entire inorganic substances in the conductive paste. If the content exceeds 30 wt %, the proportion of the inorganic refractory filler in the conductive layer increases, and consequently, the electrical resistance of the conductive layer tends to be too high, and the conductive strip tends to hardly perform the function as a heating strip. Besides, the low melting point glass tends to be too small, whereby baking of the conductive layer to the glass plate tends to be inadequate.

In the present invention, the low melting point glass powder is one having the following composition as represented by wt % of oxides in order to make sure that during the bending of the glass plate, the conductive layer is baked to the glass plate by the low melting point glass formed by melting of the low melting point glass powder and in order to improve the abrasion resistance of the conductive layer by coating the conductive layer surface with the low melting point glass:

| | |
|---|---|
| PbO | 50 to 85 wt %, |
| $B_2O_3$ | 10 to 35 wt %, |
| $SiO_2$ | 1 to 25 wt %, |
| $TiO_2$ | 0 to 20 wt %, |
| $ZrO_2$ | 0 to 15 wt %, |
| $SnO_2$ | 0 to 10 wt %, |
| $Al_2O_3 + CeO_2$ | 0 to 2 wt %, |
| $Li_2O + Na_2O + K_2O$ | 0 to 3 wt %, |
| $MgO + CaO + SrO + BaO$ | 0 to 3 wt %, |
| $P_2O_5$ | 0 to 3 wt %, |
| Zno | 2 to 20 wt %. |

PbO is essential as a flux component. If it is less than 50 wt %, the softening point tends to be too high, whereby the fluidity tends to be poor, and baking of the conductive layer to the glass plate tends to be inadequate. Preferably, it is at least 55 wt %, more preferably at least 60 wt %. If it exceeds 85 wt %, the chemical durability tends to be poor. Preferably, it is at most 83 wt %, more preferably at most 80 wt %, most preferably at most 70 wt %.

$B_2O_3$ is essential as a flux component. If it is less than 10 wt %, the softening point tends to be too high. It is preferably at least 12 wt %. If it exceeds 35 wt %, the chemical durability tends to be low. It is preferably at most 30 wt %, more preferably at most 25 wt %.

$SiO_2$ is a component for forming a network structure and is essential to control the chemical, thermal and mechanical properties. If it is less than 1 wt %, the chemical durability tends to be poor. It is preferably at least 2 wt %, more preferably at least 4 wt %. If it exceeds 25 wt %, the softening point tends to be too high. It is preferably at most 20 wt %, more preferably at most 15 wt %.

Each of $TiO_2$, $ZrO_2$ and $SnO_2$ is not an essential component, but may be incorporated in order to improve the crystallizability and the chemical resistance. Here, the crystallizability means a phenomenon such that as the temperature of the low melting point glass powder is raised, it starts to soften and flow at a temperature lower than the softening point of soda lime glass, and then crystallization will start. By the crystallization, the fluidity tends to be low when a crystallizable low melting point glass powder is employed as compared with a case where a non-crystallizable low melting point glass is employed. Accordingly, by employing a crystallizable low melting point glass powder, it is possible to prevent adhesion of the low melting point glass to the mold which is used for bending.

In order to prevent devitrification during melting of the glass, $TiO_2$ is preferably at most 20 wt %, more preferably at most 17 wt %. Likewise, $ZrO_2$ is preferably at most 15 wt %, more preferably at most 12 wt %. Likewise, $SnO_2$ is preferably at most 10 wt %, more preferably at most 2 wt %.

$Al_2O_3$ and $CeO_2$ are not essential components, but may be incorporated in a total amount of $Al_2O_3+CeO_2$ being up to 2 wt %, for the purpose of improving the chemical durability. If they exceed 2 wt %, the softening point tends to be too high. They are preferably from 0.1 to 1 wt %.

$Li_2O$, $Na_2O$ and $K_2O$ are not essential components, but may be incorporated as flux components in a total amount of $Li_2O+Na_2O+K_2O$ being 3 wt %. If they exceed 3 wt %, the thermal expansion coefficient tends to be too large. They are preferably at most 1 wt %.

MgO, CaO, SrO and BaO are not essential components, but may be incorporated in a total amount of MgO+CaO+SrO+BaO being up to 3 wt %, for the purpose of improving the solubility or controlling the thermal expansion coefficient.

$P_2O_5$ is not an essential component, but may be incorporated in an amount of up to 3 wt %, in order to improve the chemical durability, particularly acid resistance. If it exceeds 3 wt %, devitrification takes place during melting of the glass, such being undesirable.

ZnO is essential as a flux component. If it is less than 2 wt %, the softening point tends to be too high, whereby the fluidity tends to be poor, and baking of the conductive layer to the glass plate tends to be inadequate. It is preferably at least 4 wt %, more preferably at least 5 wt %. If it exceeds 20 wt %, the chemical durability tends to be poor. It is preferably at most 15 wt %, more preferably at most 10 wt %.

The softening point of the low melting point glass in the present invention is preferably from 400 to 600° C.

Now, the window for an automobile according to the present invention will be described.

The window for an automobile of the present invention has conductive strips and employs the glass plate provided with a conductive layer of the present invention which is excellent in abrasion resistance. The window for an automobile of the present invention having bus bars connected to both ends of the conductive strips can be used as a sliding window glass plate having an antifogging function, which is useful for a rear window, a side window, etc. of an automobile, when the conductive strips are used as heating elements. Further, the window for an automobile of the present invention can be used as a sliding window glass plate having a broadcast receiving function which is useful for a rear window, etc. of an automobile, when the conductive strips are used as antenna elements for receiving radio or television broadcast.

In the foregoing, the present invention has been described with reference to a case where the conductive layer is baked to a glass plate. However, the present invention is not limited to such a case, and the present invention can also be applied, for example, to a case wherein the conductive layer is baked to a ceramic color layer formed on a glass plate surface. Further, it is also possible to color the conductive layer by employing a colored glass as the low melting point glass.

Still further, it is possible to further improve the chemical durability of the conductive layer by employing a glass excellent in chemical durability, such as a glass excellent in corrosion resistance against an acidic liquid, as the low melting point glass.

Now, the present invention will be described with reference to Examples. However, it should be understood that the present invention is by no means restricted to such specific Examples.

EXAMPLES 1 TO 12

Materials were mixed to obtain compositions as identified in the columns for "Low melting point glass composition" in Tables 1 and 2. Each mixture was put into a platinum crucible and melted at 1,500° C. Then, the molten glass was cooled by a roller and formed into flakes. The glass flakes were pulverized to an average particle size of from 3 to 5 μm by a ball mill to obtain a low melting point glass powder. In a case where an inorganic refractory filler was incorporated, the inorganic refractory filler was put into a ball mill together with the glass flakes, followed by mixing and pulverization to obtain a low melting point glass powder.

As the organic varnish, an ethyl cellulose resin having a polymerization degree of 4 was dissolved in α-terpineol to obtain one having a concentration of 10 wt %.

Then, the silver powder, the low melting point glass powder, the inorganic refractory filler powder and the organic varnish were mixed in the proportions as identified in the upper portions of Tables 1 and 2, followed by kneading in a porcelain mortar for 1 hour and further by dispersion by three rolls for three times to obtain an conductive paste.

As the silver powder, one obtained by mixing a foil shaped silver powder having an average particle size of 8 μm and a spherical silver powder having an average particle size of 3 μm in a weight ratio of 50:50, was employed.

This conductive paste was printed on a glass plate surface by a screen printing machine to form three linear conductive strips each having a width of 0.5 mm and a length of about 200 mm. Then, the printed plate was dried at 120° C. for 10 minutes and fired in an electric furnace at 670° C. for 5 minutes to obtain a glass plate provided with a conductive layer.

With respect to the conductive strips of the obtained glass plate provided with the conductive layer, the presence or absence of the glass exudate coating layer, the overcoating amount of the glass exudate coating layer, the resistivity and the change in the electrical resistance, were measured by the methods which will be described hereinafter. The results are shown in Table 1 and 2. Examples 1 to 10 represent Working Examples of the present invention, and Examples 11 and 12 represent Comparative Examples. In the column for "Inorganic refractory filler powder", symbol * indicates that alumina was used as the inorganic refractory filler powder, and symbol ** indicates that forsterite was used as the inorganic refractory filler powder.

Presence or absence of glass exudate coating layer: The presence or absence of the glass exudate coating layer was observed by an optical microscope with 100 magnifications.

Overcoating degree of glass exudate coating layer: Under observation by an optical microscope with 100 magnifications, the overcoating degree of the glass exudate coating layer from the edge face of the conductive layer was measured. With a view to securing the visibility and preventing a deformation of a see-through image, an overcoating degree of not more than 0.1 mm was taken as acceptable.

Resistivity: The electrical resistance R was measured by means of a digital multimeter manufactured by Kabushiki Kaisha Advantest. Further, the cross-sectional shape was measured by means of Surfcom (tradename), manufactured by Tokyo Seimitsu K.K. and the cross-section S was calculated by integration, whereupon the resistivity was obtained by resistivity=R×S/L (in Table 1, an average value of resistivities of three conductive strips is indicated). With a view to securing the conductivity, a resistivity of not higher than 20 μΩ·cm was taken as acceptable. In the above formula, L is the length of a conductive strip.

Change in electrical resistance: The electrical resistance was measured by means of a digital multimeter manufactured by Kabushiki Kaisha Advantest. Then, under the following conditions for a window sliding test, the abrasion and the chemical deterioration of the printed surface of conductive strips on a glass plate, were accelerated. After this acceleration test, the electrical resistance was measured. The change in the average value of electrical resistances of three conductive strips as between before and after the acceleration test, was calculated, and this was represented by %, which was taken as the change in electrical resistance. With a view to securing the abrasion resistance, the change in electrical resistance is preferably at most 5%.

Conditions for a window sliding test: While contacting a rubber packing made of the same material as a weather strip which frictionally contacts a rear window, to a test surface of about 100 mm×100 mm so that a load of from 0.1 to 2 N/cm will be exerted thereto uniformly, the test surface is moved up and down for 5,000 times at a speed of from 50 to 500 mm/sec. At that time, from 10 to 50 ml of dust water is sprayed to the test surface once every 100 to 500 times of the up and down movements. As the dust water, one prescribed in JIS Z8901, is used.

TABLE 1

|  | Ex. 1 | Ex. 2 | Ex. 3 |
| --- | --- | --- | --- |
| Silver powder (wt %) | 60 | 50 | 70 |
| Low melting glass powder (wt %) | 20 | 30 | 10 |
| Inorganic refractory filler powder (wt %) | 0 | 0 | 0 |
| Organic varnish (wt %) | 20 | 20 | 20 |
| Proportion of low melting glass powder (wt %) | 25 | 37.5 | 12.5 |
| Low melting point glass composition (wt %) |  |  |  |
| PbO | 60 | 72 | 68 |
| $B_2O_3$ | 12.5 | 12 | 20 |
| $SiO_2$ | 12 | 7 | 5 |
| $TiO_2$ | 1 | 0 | 0 |
| $ZrO_2$ | 0 | 0 | 0 |
| $SnO_2$ | 0 | 0 | 1 |
| $Al_2O_3$ | 1 | 1 | 0 |
| $CeO_2$ | 0 | 1 | 0 |
| $Li_2O$ | 0.5 | 0 | 0 |
| $Na_2O$ | 0.5 | 0 | 0 |
| $K_2O$ | 0 | 1 | 0 |
| MgO | 0 | 1 | 0 |
| CaO | 1 | 0 | 0 |
| SrO | 0 | 0 | 0 |
| BaO | 0 | 1 | 0 |
| $P_2O_5$ | 0 | 0.5 | 0 |
| ZnO | 11.5 | 3.5 | 6 |
| Presence or absence of glass exudate coating layer | Present | Present | Present |
| Overcoating degree of glass exudate coating layer (mm) | 0.05 | 0.06 | 0.01 |
| Resistivity (μ Ω.cm) | 6.2 | 8.2 | 4.5 |
| Change in electrical resistance (%) | 2 | 1 | 2 |

|  | Ex. 4 | Ex. 5 | Ex. 6 |
| --- | --- | --- | --- |
| Silver powder (wt %) | 80 | 40 | 63.7 |
| Low melting glass powder (wt %) | 10 | 40 | 9.1 |
| Inorganic refractory filler powder (wt %) | 0 | 0 | 9.1* |
| Organic varnish (wt %) | 10 | 20 | 18.1 |
| Proportion of low melting | 11.1 | 50 | 11.1 |

TABLE 1-continued

| glass powder (wt %) Low melting point glass composition (wt %) | | | |
|---|---|---|---|
| PbO | 65 | 80 | 68 |
| $B_2O_3$ | 20 | 10 | 20 |
| $SiO_2$ | 8 | 2 | 5 |
| $TiO_2$ | 0 | 0 | 0 |
| $ZrO_2$ | 0 | 0 | 0 |
| $SnO_2$ | 1 | 0 | 1 |
| $Al_2O_3$ | 0 | 1 | 0 |
| $CeO_2$ | 0 | 0 | 0 |
| $Li_2O$ | 0 | 0 | 0 |
| $Na_2O$ | 0 | 0 | 0 |
| $K_2O$ | 0 | 0 | 0 |
| MgO | 0 | 0 | 0 |
| CaO | 0 | 0 | 0 |
| SrO | 0 | 0 | 0 |
| BaO | 0 | 0 | 0 |
| $P_2O_5$ | 0 | 0 | 0 |
| ZnO | 6 | 7 | 6 |
| Presence or absence of glass exudate coating layer | Present | Present | Present |
| Overcoating degree of glass exudate coating layer (mm) | 0.01 | 0.08 | 0.01 |
| Resistivity ($\mu\Omega\cdot cm$) | 4.0 | 9.5 | 4.7 |
| Change in electrical resistance (%) | 3 | 1 | 2 |

TABLE 2

| | Ex. 7 | Ex. 8 | Ex. 9 |
|---|---|---|---|
| Silver powder (wt %) | 68.6 | 66.5 | 54.6 |
| Low melting glass powder (wt %) | 9.8 | 9.5 | 18.1 |
| Inorganic refractory filler powder (wt %) | 2* | 4.8* | 9.1** |
| Organic varnish (wt %) | 19.6 | 19.2 | 18.1 |
| Proportion of low melting glass powder (wt %) | 12.2 | 11.8 | 22.1 |
| Low melting point glass composition (wt %) | | | |
| PbO | 68 | 68 | 60 |
| $B_2O_3$ | 20 | 20 | 12.5 |
| $SiO_2$ | 5 | 5 | 12 |
| $TiO_2$ | 0 | 0 | 1 |
| $ZrO_2$ | 0 | 0 | 0 |
| $SnO_2$ | 1 | 1 | 0 |
| $Al_2O_3$ | 0 | 0 | 1 |
| $CeO_2$ | 0 | 0 | 0 |
| $Li_2O$ | 0 | 0 | 0.5 |
| $Na_2O$ | 0 | 0 | 0 |
| $K_2O$ | 0 | 0 | 0.5 |
| MgO | 0 | 0 | 0 |
| CaO | 0 | 0 | 1 |
| SrO | 0 | 0 | 0 |
| BaO | 0 | 0 | 0 |
| $P_2O_5$ | 0 | 0 | 0 |
| ZnO | 6 | 6 | 11.5 |
| Presence or absence of glass exudate coating layer | Present | Present | Present |
| Overcoating degree of glass exudate coating layer (mm) | 0.01 | 0.01 | 0.03 |
| Resistivity ($\mu\Omega\cdot cm$) | 4.6 | 4.6 | 6.6 |
| Change in electrical resistance (%) | 1 | 1 | 0 |

| | Ex. 10 | Ex. 11 | Ex. 12 |
|---|---|---|---|
| Silver powder (wt %) | 58.8 | 75 | 30 |
| Low melting glass powder (wt %) | 19.6 | 5 | 50 |
| Inorganic refractory filler powder (wt %) | 2** | 0 | 0 |
| Organic varnish (wt %) | 19.6 | 20 | 20 |
| Proportion of low melting glass powder (wt %) | 24.4 | 6.2 | 62.5 |
| Low melting point glass composition (wt %) | | | |
| PbO | 60 | 45 | 60 |
| $B_2O_3$ | 12.5 | 9 | 15 |
| $SiO_2$ | 12 | 27 | 10 |
| $TiO_2$ | 1 | 0 | 0 |
| $ZrO_2$ | 0 | 1 | 0 |
| $SnO_2$ | 0 | 1 | 0 |
| $Al_2O_3$ | 1 | 12 | 4 |
| $CeO_2$ | 0 | 0 | 0 |
| $Li_2O$ | 0.5 | 1 | 3 |
| $Na_2O$ | 0 | 0 | 0 |
| $K_2O$ | 0.5 | 0 | 2 |
| MgO | 0 | 0 | 0 |
| CaO | 0 | 3 | 0 |
| SrO | 0 | 0 | 0 |
| BaO | 1 | 0 | 1 |
| $P_2O_5$ | 0 | 0 | 0 |
| ZnO | 11.5 | 1 | 5 |
| Presence or absence of glass exudate coating layer | Present | Absent | Present |
| Overcoating degree of glass exudate coating layer (mm) | 0.04 | 0.01 | 1.5 |
| Resistivity ($\mu\Omega\cdot cm$) | 6.3 | 4.2 | 32.0 |
| Change in electrical resistance (%) | 1 | 18 | 0 |

In Examples 1 to 10, there was no problem in each of the overcoating amount of glass exudate coating layer, the resistivity and the change in electrical resistance. In Example 11, there was no glass exudate coating layer, whereby the abrasion resistance was poor, and the change in electrical resistance was larger than 5% as the acceptable value. In Example 12, the overcoating amount of the glass exudate coating layer was larger than 0.1 mm as the acceptable value, whereby the product was no good with respect to the visibility and the deformation of see-through image, and the resistivity was higher than 20 $\mu\Omega\cdot cm$ as the acceptable value, whereby the necessary electrical conductivity could not be secured.

According to the present invention, it is possible to obtain a glass plate provided with a conductive layer which is excellent in the abrasion resistance. By using this glass plate provided with a conductive layer as a sliding automobile window glass plate having a broadcast receiving function, it will be possible to maintain the broadcast receiving function for a long period of time.

What is claimed is:

1. A glass plate provided with a conductive layer, which comprises a glass plate, a conductive layer baked to the glass plate and containing a conductive material as the main component, and a glass exudate coating layer formed to substantially cover the conductive layer, wherein the conductive layer has a portion to be connected with a power supply terminal, and said portion is not substantially covered by the glass exudate coating layer, and the conductive layer is one formed by firing a conductive paste printed on the glass plate, and the glass exudate coating layer is one formed by exudation to the conductive layer surface of low melting point glass formed by melting of a low melting point glass powder contained in the conductive paste at the time of firing, and wherein the conductive paste contains inorganic components and the inorganic components of the conductive paste comprise substantially from 50 to 90 wt % of a conductive material powder, from 10 to 50 wt % of a low melting point glass powder and from 0 to 30 wt % of an inorganic refractor filler powder, and the low melting point glass has substantially the following composition as represented by wt % of oxides:

| | |
|---|---|
| PbO | 50 to 85 wt %, |
| $B_2O_3$ | 10 to 35 wt %, |
| $SiO_2$ | 1 to 25 wt %, |
| $TiO_2$ | 0 to 20 wt %, |
| $ZrO_2$ | 0 to 15 wt %, |
| $SnO_2$ | 0 to 10 wt %, |
| $Al_2O_3 + CeO_2$ | 0 to 2 wt %, |
| $Li_2O + Na_2O + K_2O$ | 0 to 3 wt %, |
| $MgO + CaO + SrO + BaO$ | 0 to 3 wt %, |
| $P_2O_5$ | 0 to 3 wt %, |
| Zno | 2 to 20 wt %. |

2. A method for producing a glass plate provided with a conductive layer according to claim 1, which comprises printing on a glass plate a conductive paste comprising at least from 50 to 90 wt % of a conductive material powder and from 10 to 50 wt % of a low melting point glass powder, as inorganic components, followed by firing, wherein the conductive paste contains inorganic components, and the inorganic components of the conductive paste comprise substantially from 50 to 90 wt % of a conductive material powder, from 10 to 50 wt % of a low melting point glass powder and from 0 to 30 wt % of an inorganic refractory filler powder and the low melting point glass has substantially the following composition as represented by wt % of oxides:

| | |
|---|---|
| PbO | 50 to 85 wt %, |
| $B_2O_3$ | 10 to 35 wt %, |
| $SiO_2$ | 1 to 25 wt %, |
| $TiO_2$ | 0 to 20 wt %, |
| $ZrO_2$ | 0 to 15 wt %, |
| $SnO_2$ | 0 to 10 wt %, |
| $Al_2O_3 + CeO_2$ | 0 to 2 wt %, |
| $Li_2O + Na_2O + K_2O$ | 0 to 3 wt %, |
| $MgO + CaO + SrO + BaO$ | 0 to 3 wt %, |
| $P_2O_5$ | 0 to 3 wt %, |
| Zno | 2 to 20 wt %. |

3. A window for an automobile, wherein the glass plate provided with a conductive layer as defined in claim 1, is used as a sliding window glass plate for the automobile.

4. A conductive paste wherein the conductive paste contains inorganic components, and the inorganic components of the conductive paste comprise substantially from 50 to 90 wt % of a conductive material powder, from 10 to 50 wt % of a low melting point glass powder and from 0 to 30 wt % of an inorganic refractory filler powder, and the low melting point glass has substantially the following composition as represented by wt % of oxides:

| | |
|---|---|
| PbO | 50 to 85 wt %, |
| $B_2O_3$ | 10 to 35 wt %, |
| $SiO_2$ | 1 to 25 wt %, |
| $TiO_2$ | 0 to 20 wt %, |
| $ZrO_2$ | 0 to 15 wt %, |
| $SnO_2$ | 0 to 10 wt %, |
| $Al_2O_3 + CeO_2$ | 0 to 2 wt %, |
| $Li_2O + Na_2O + K_2O$ | 0 to 3 wt %, |
| $MgO + CaO + SrO + BaO$ | 0 to 3 wt %, |
| $P_2O_5$ | 0 to 3 wt %, |
| Zno | 2 to 20 wt %. |

\* \* \* \* \*